United States Patent [19]
Yoshimura et al.

[11] Patent Number: 5,844,408
[45] Date of Patent: *Dec. 1, 1998

[54] PHASE DIFFERENCE MEASURING APPARATUS FOR MEASURING PHASE DIFFERENCE BETWEEN INPUT SIGNALS

[75] Inventors: Hiroyuki Yoshimura, Kanagawa; Akira Morita, Tokyo, both of Japan

[73] Assignee: Fuji Electric Co., Ltd., Kawasaki, Japan

[*] Notice: The term of this patent shall not extend beyond the expiration date of Pat. No. 5,767,665.

[21] Appl. No.: 806,161

[22] Filed: Feb. 25, 1997

[30] Foreign Application Priority Data

Feb. 26, 1996 [JP] Japan ................................. 8-037766

[51] Int. Cl.$^6$ ................................. G01R 25/00
[52] U.S. Cl. ........................ 324/76.52; 324/76.55; 73/861.356
[58] Field of Search ................ 324/76.52, 76.53, 324/76.55, 76.68; 73/861.355, 861.356; 364/510, 484

[56] References Cited

U.S. PATENT DOCUMENTS

| | | | |
|---|---|---|---|
| 3,513,385 | 5/1970 | Pascoe | 324/76.52 X |
| 3,895,294 | 7/1975 | Vinding | 324/76.52 X |
| 4,321,602 | 3/1982 | Kipp. | |
| 5,024,104 | 6/1991 | Dames. | |
| 5,050,439 | 9/1991 | Thompson | 73/861.356 |
| 5,052,231 | 10/1991 | Christ et al. . | |
| 5,069,074 | 12/1991 | Young et al. | 73/861.356 |
| 5,469,748 | 11/1995 | Kalotay | 73/861.356 |

FOREIGN PATENT DOCUMENTS

| | | |
|---|---|---|
| 0 702 212 A2 | 3/1996 | European Pat. Off. . |
| 43 23028 A1 | 1/1995 | Germany . |
| WO 88/02105 | 3/1988 | WIPO . |
| WO 95/29385 | 11/1995 | WIPO . |

*Primary Examiner*—Michael Brock
*Attorney, Agent, or Firm*—Greer, Burns & Crain, Ltd.

[57] ABSTRACT

A phase difference measuring apparatus for precisely measuring a phase difference between two input signals having the same frequency sent from, for example, a Coriolis type mass flowmeter. A differential amplifier in the apparatus provides the sum or difference of the two input signals and a multiplexor sequentially selects and outputs to an A/D converter the two input signals and the output of the differential amplifier. The A/D converter converts the output of the multiplexor into digital data and a digital signal processor or a microcomputer calculates the phase difference between the two input signals based on the converted digital data. The apparatus may further comprise a function that an error caused by the difference of the transfer characteristics of a filter and the A/D converter is compensated using a reference signal which is selected from the two input signals.

12 Claims, 11 Drawing Sheets

PHASE DIFFERENCE MEASURING APPARATUS FOR MEASURING PHASE DIFFERENCE BETWEEN INPUT SIGNALS

BACKGROUND OF THE INVENTION

1. Field of the Invention

The present invention relates to a phase difference measuring apparatus for measuring a phase difference or a very small time difference between two signals having the same frequency. The phase difference measuring apparatus can be used in various fields including a Coriolis type mass flowmeter, which is a typical example to which a phase difference measuring apparatus is applied. In the Coriolis type mass flowmeter, a measurement pipe in which a fluid flows is vibrated to generate a Coriolis force, and a phase difference of the measurement pipe, which appears according to the Coriolis force between an upstream portion and a downstream portion of the measurement pipe, is detected. Since the Coriolis force varies corresponding to the mass and speed of the fluid flowing in the measurement pipe, the mass flow rate can be obtained by detecting the phase difference between the vibration of the measurement pipe at its upstream and downstream portions using the phase difference measuring apparatus.

2. Description of the Related Art

The applicant has filed a U.S. Patent application Ser. No. 08/526,706 for inventions relating to the Coriolis type mass flowmeter and the phase difference measurement apparatus.

Figure 1:
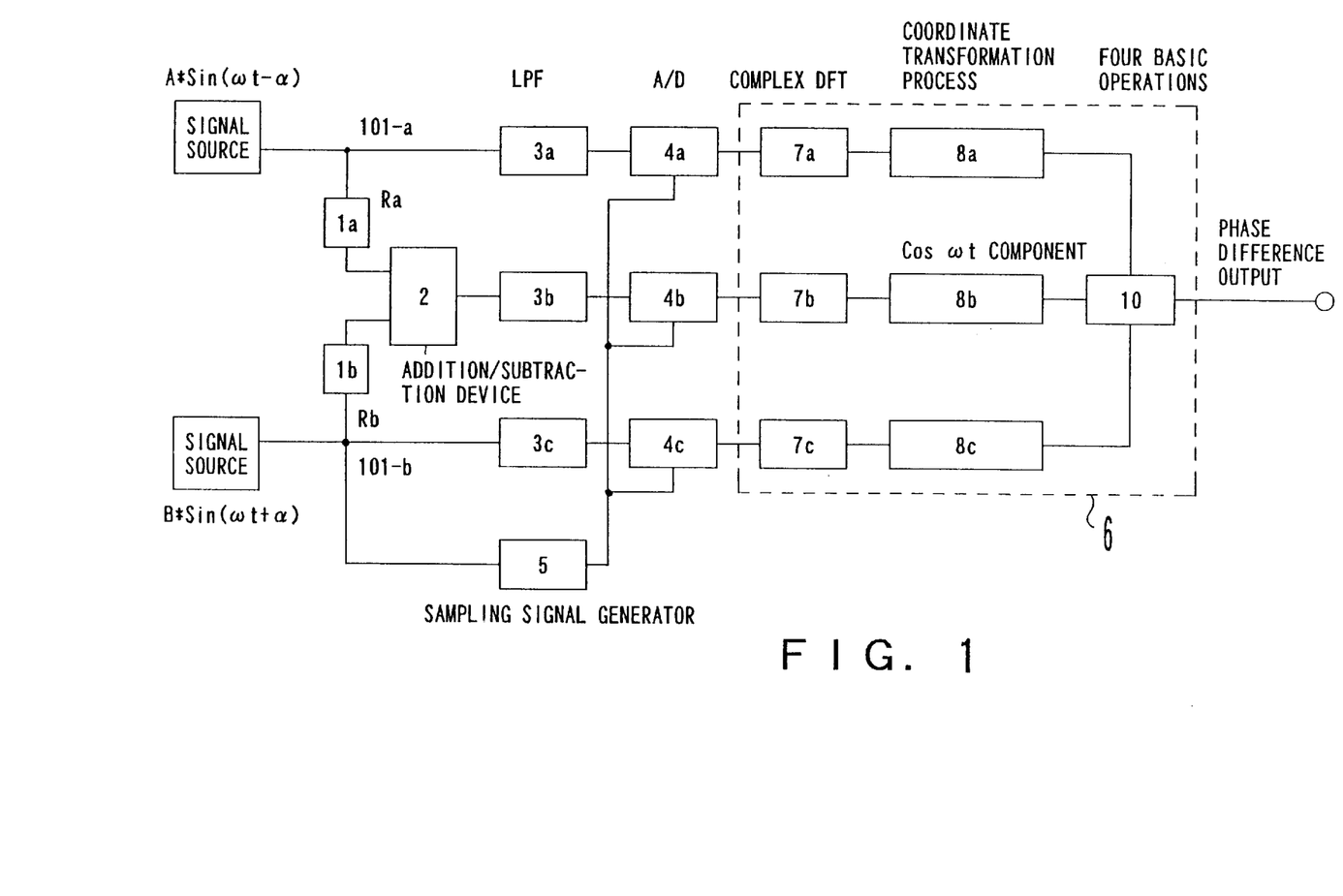
FIG. 1 shows an example of the configuration of a phase difference measuring apparatus.

FIG. 1 shows a configuration of an example of a phase difference measurement apparatus for measuring a phase difference between two input signals at a specific frequency. The two input signals input from respective signal sources, for example, detection signals from a mass flowmeter, are expressed as follows:

First input signal (101 – a): $A^*\sin(\omega t - \alpha)$ (1)

Second input signal (101 – b): $A^*\sin(\omega t + \alpha)$

The first input signal 101-a and the second input signal 101-b are input to a differential amplifier (addition/subtraction device) 2, the amplification factor of which is C, through adding (summing) resistors or input resistors 1a and 1b having matched resistances Ra and Rb, respectively. The differential amplifier 2 amplifies the difference between the two input signals and outputs a signal described by the following equation (2).

Output of the differential amplifier 2:

$$\{A^*\sin(\omega t - \alpha) - B^*\sin(\omega t + \alpha)\}^*C = \quad (2)$$

$$(A - B)^*C^*\cos\alpha^*\sin(\omega t) - (A + B)^*C^*\sin\alpha^*\cos(\omega t)$$

Figure 2:
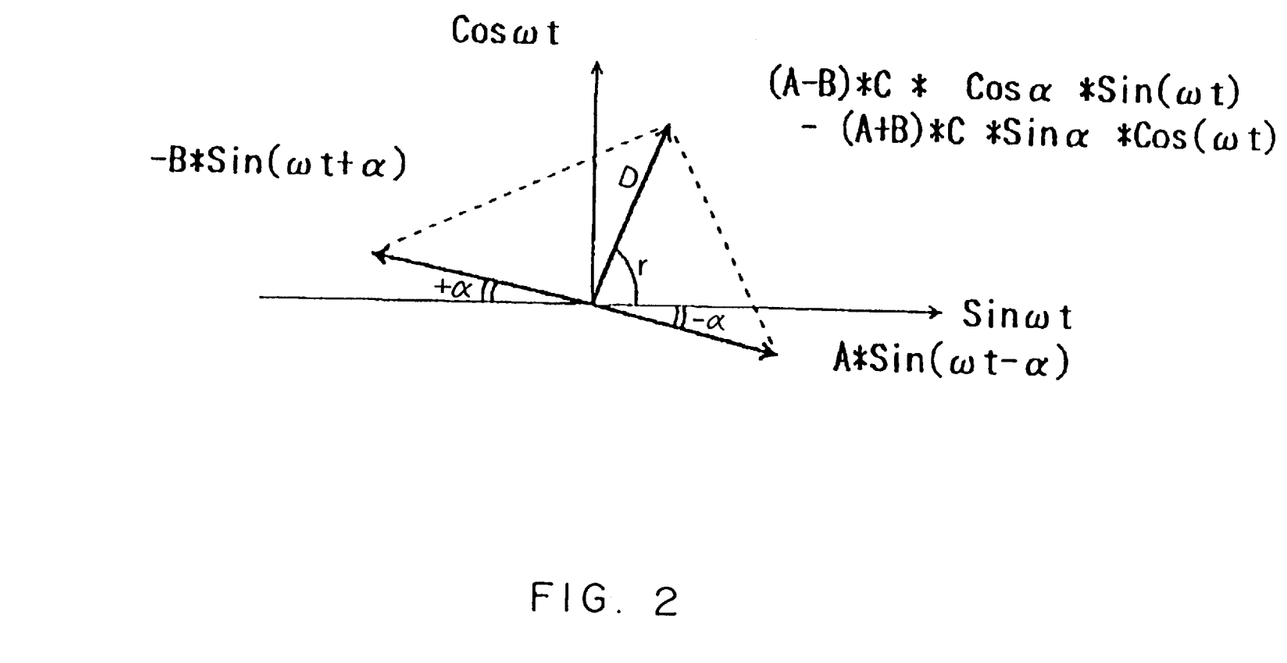
FIG. 2 is a vector diagram indicating the relationship between the input signals of the A/D converters and the output of the differential amplifier in FIG. 1.

This equation indicates that the output of the differential amplifier 2 is expressed by a vector which contains a $\cos(\omega t)$ component and a $\sin(\omega t)$ component. The vector map in FIG. 2 shows the relationship between the two input signals and the output of the differential amplifier 2.

These three signals are input to A/D converters 4a, 4b and 4c through respective low-pass filters 3a, 3b and 3c, and converted into digital data. The digital data are transmitted to a DSP (Digital Signal Processor) or microcomputer 6, which functions as a calculation processing unit, and are subjected to a phase detection process by complex DFT (Digital Fourier Transformation) units 7a, 7b and 7c in the DSP, so as to be separated into $\cos(\omega t)$ components and $\sin(\omega t)$ components. As shown in the equation (2), the $\cos(\omega t)$ component of the output signal of the differential amplifier 2 is indicated as follows:

$$(A+B)^*C^*\sin\alpha \quad (2\text{-}1)$$

Therefore, $\sin\alpha$ and the phase difference $2\alpha$ between the two input signals can be obtained by the calculation using the output of the differential amplifier 2.

The calculation for obtaining the phase difference $2\alpha$ is performed in the DSP or microcomputer 6. The DFT units 7a, 7b and 7c perform the complex DFT process on the input digital data (discrete data), which is described by the following equation (3), and expand the input data into a $\cos(\omega t)$ component and a $\sin(\omega t)$ component.

$$X(nf) = \sum_{K=1}^{K=Q} x(t)e^{-j2\pi n K/P} \quad (3)$$

P: sampling number in one wave-length
Q: total sampling number
f: frequency

Then, coordinate transformation process units 8a, 8b and 8c transform a vector in the orthogonal coordinate system comprising a $\cos(\omega t)$ component and a $\sin(\omega t)$ component, which are the resultant of the complex DFT process, into values in the polar coordinate system, and calculate the amplitudes A and B of the first and second input signals 101-a and 101-b. After that, the phase difference between the first and second input signals 101-a and 101-b is calculated by a phase calculation unit 10. As shown in FIG. 2, the calculated phase difference is indicated by the following equation (4-0) using the absolute value D and the phase $\gamma$ of the output vector from the differential amplifier 2.

$$(A+B)^*C^*\sin\alpha/D = \sin\gamma \quad (4\text{-}0)$$

Therefore, $\alpha$ is determined as follows:

$$\alpha = \sin^{-1}[\{D^*\sin(\gamma)\}/\{(A+B)^*C\}] \quad (4)$$

Referring to the equation (4), it is understood that the important factors for calculating the value of $\alpha$ are the amplitudes and phases, and the detection of a proper $\alpha$ without errors can be made by a precise measurement of these factors. Accordingly, the temperature characteristics and the frequency characteristics of the devices and elements on the three lines, through which the first and second input signals and the output of the differential amplifier 2 flow, are very important, and the effects of which should be corrected or compensated for the precise detection of the phase difference. Furthermore, the low pass filters 3a, 3b and 3c and the A/D converters 4a, 4b and 4c include variations in gains and phases and their own temperature and frequency characteristics. Considering these factors, the above equations (1) and (2) change to the following equation (5).

First input signal:

$$E^*A^*\sin(\omega t - \alpha - \beta)$$

Second input signal:

$$F^*B^*\sin(\omega t + \alpha - \delta)$$

Output of the differential amplifier 2:

$$G^*(A - B)^*C^*\cos\alpha^*\sin(\omega t - \zeta) - G^*(A + B)^*C^*\sin\alpha^*\cos(\omega t - \zeta) \quad (5)$$

Here, E and $\beta$ respectively indicate a gain and a phase delay with respect to the A/D converter 4a and the filter 3a in the line for the first input signal, F and $\gamma$ respectively indicate a gain and a phase delay with respect to the A/D converter 4c and the filter 3c in the line for the second input signal, and G and $\zeta$ respectively indicate a gain and a phase delay with respect to the A/D converter 4b and the filter 3b in the line for the output of the differential amplifier 2.

Considering the equation (5), the correction or compensation according to the characteristics of each filter and A/D converter is necessary for the precise measurement of the phase difference. In the conventional method for measuring the phase difference, errors between true values and detected values of the two input signals, the phase difference of which are known, are measured using a predetermined frequency and temperature and arranged in the form of a map, and the correction or the compensation are performed according to the map.

However, a phase difference measurement or a time difference measurement which requires a high precision measurement over a large frequency range and temperature range, depends on the frequency and temperature characteristics (gains, phase delays, etc.) of all the low-pass filters and A/D converters in the three lines. Therefore, the conventional compensation method does not match the precise measurement, because it takes a long time to decide accurate phase differences. If the conventional method is used for the precise measurement, a number of adjustment iterations will be required to the low-pass filters and the A/D converters in a plurality of lines in order to eliminate the characteristic differences between elements. In addition, the adjusted characteristics may be changed during the measurement as the temperature or the frequency changes.

SUMMARY OF THE INVENTION

In view of the foregoing, the object of the present invention is to provide a phase difference measurement apparatus and method in which a high precision measurement can be obtained without adjusting the characteristics of low pass filters and A/D converters in the apparatus for eliminating the differences between these elements.

A phase difference measuring apparatus according to the present invention is for measuring a phase difference between two input signals having a same frequency. This apparatus comprises: a addition/subtraction unit (or a differential amplifier) for obtaining and outputting the sum or the difference of the two input signals; a switching unit for sequentially selecting and outputting the two input signals and an output of the addition/subtraction unit; an A/D converter unit for converting output signals of the switching unit into discrete data (analog-digital conversion); and a calculation unit for calculating a phase difference between the two input signals based on the outputs of the A/D converter unit.

The phase difference measuring apparatus may further comprise a filter for selectively passing low frequency components of output signals of the switching unit to the A/D converter unit. The filter may be a frequency tracking type filter.

The phase difference measuring apparatus may further comprise a reference signal selection unit for selecting one of the two input signals as a reference signal and outputting the reference signal to the addition/subtraction unit and the switching unit. In this case, the calculation unit calculates the transmission characteristics of at least one of the addition/subtraction unit and the A/D converter unit based on the output signals of the A/D converter unit corresponding to the reference signal, and corrects the calculated phase difference of the two input signals using the calculated transmission characteristics.

The phase difference measuring apparatus may further comprise a filter for selectively passing low frequency components of output signals from the switching unit to the A/D converter unit, and the calculation unit may calculate transmission characteristics of the filter for correcting the calculated phase difference.

The phase difference measuring apparatus may further comprise three filters for selectively passing low frequency components included in an output of the addition/subtraction unit and the two input signals, which are input to the switching unit, respectively.

A second phase difference measuring apparatus according to the invention comprises: an addition/subtraction unit for obtaining and outputting the sum or the difference of the two input signals; an A/D converter unit for converting the two input signals and an output signal from the addition/subtraction unit into discrete data; a reference signal selection unit for selecting one of the two input signals as a reference signal and outputting the reference signal to the addition/subtraction unit and the A/D converter unit; and a calculation unit for calculating a phase difference between the two input signals based on the outputs from the A/D converter unit, calculating the transmission characteristics of at least one of the addition/subtraction unit and the A/D converter unit based on output signals from the A/D converter unit corresponding to the reference signal if the reference signal selection unit selects the reference signal, and correcting or compensating the calculated phase difference using the calculated transmission characteristics.

The second phase difference measuring apparatus may further comprise a switching unit for sequentially selecting the two input signals and an output from the addition/subtraction unit and outputting the selected signal to the A/D converter unit. The second apparatus may further comprise a filter for selectively passing low frequency components of output signals from the switching unit to the A/D converter unit. The second apparatus may further comprise three filters for selectively passing low frequency components included in an output from the addition/subtraction unit and the two input signals, which are input to the switching unit, respectively.

A phase difference measuring method according to the present invention is for measuring a phase difference between two input signals having a same frequency. This apparatus comprises the steps of: obtaining the sum or the difference of the two input signals and outputting a first signal; sequentially selecting the first signal and the two input signals and outputting a second signal; converting the second signal into discrete data; and calculating a phase difference between the two input signals based on the discrete data.

A second phase difference measuring method according to the invention comprises the steps of: obtaining the sum or the difference of the two input signals and outputting a first signal; converting the first signal and the two input signals into discrete data; calculating a phase difference between the two input signals based on the discrete data; selecting one of the two input signals as a reference signal; calculating the transmission characteristics of a device through which the reference signal passes based on the reference signal; and correcting or compensating the calculated phase difference using the calculated transmission characteristics.

The compensation according to the present invention may include a compensation method in which the calculation unit compensates the input signals or vectors before the calculation of the phase difference and determines the phase difference based on the compensated signals or vectors.

According to the invention, as the two input signals and the output of the addition/subtraction unit (differential amplifier) are sequentially selected by the switching unit, a common A/D converter and a common low pass filter can be used in the phase difference measuring apparatus. Therefore, the differences of frequency and temperature characteristics which appear between a plurality of A/D converters and filters can be eliminated. In addition, by applying a tracking filter, which maintains constant transfer characteristics including gain and phase characteristics, to the low pass filter, the effect of a change of the frequency can be decreased. Furthermore, the tracking filter prevents aliasing caused by the sampling in the A/D converter.

In addition, since the transfer characteristics of the low pass filters and A/D converters on the three lines for the two input signals and the output of the addition/subtraction unit are detected using a reference signal selected from the two input signals, the calculated phase difference or time difference can be corrected or compensated upon considering the difference between the transfer characteristics of these elements. Therefore, if the transfer characteristics of the elements on the three lines are different from each other, the influence of the difference of the transfer characteristics of these elements upon the calculated phase difference can be eliminated.

DESCRIPTION OF THE PREFERRED EMBODIMENT

Embodiments of the phase difference measuring apparatus according to the present invention will be described below. In the description, the same reference numerals used in FIG. 1 will denote the same elements, and their explanations will be omitted.

Figure 3:
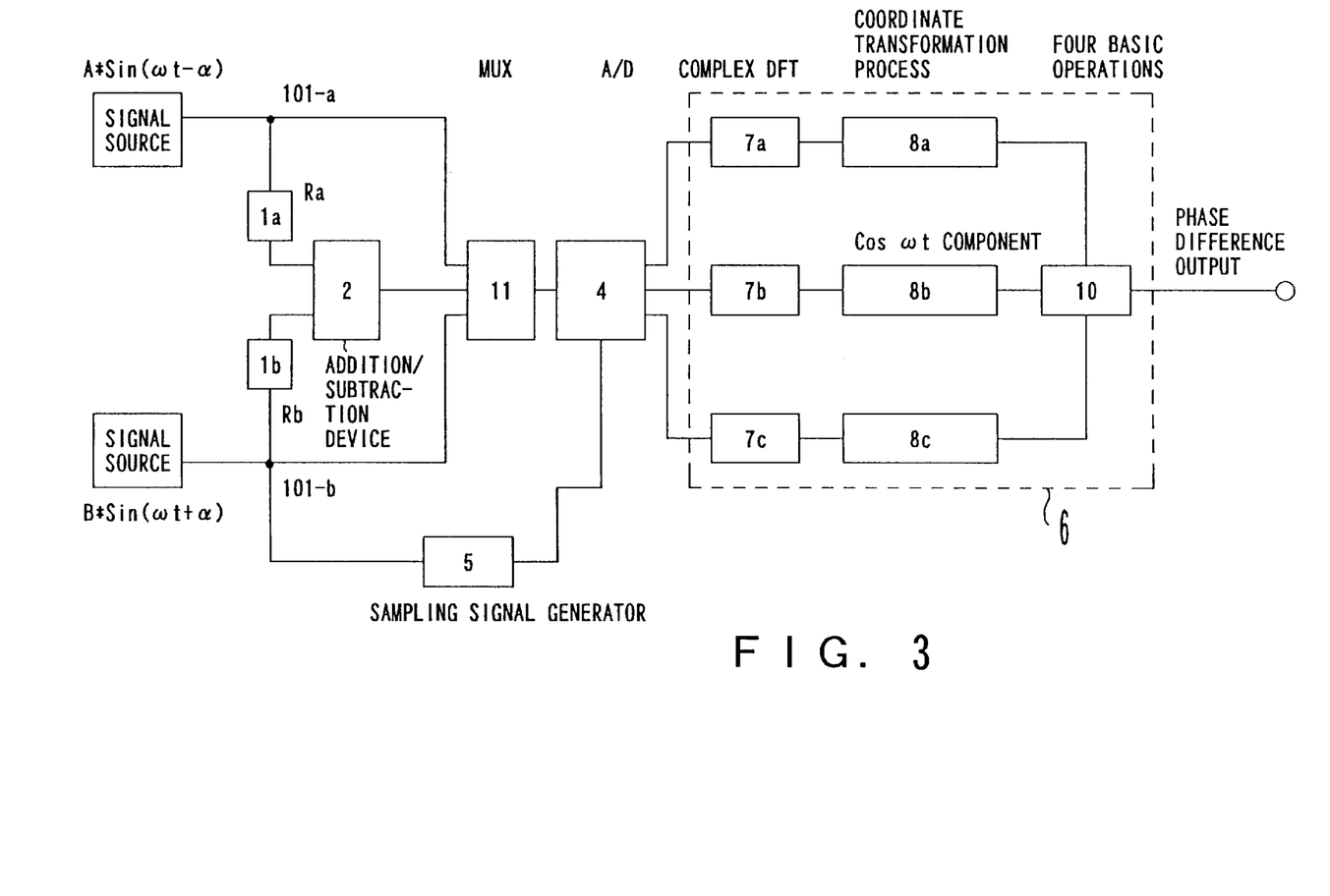
FIG. 3 shows a configuration of a phase difference measuring apparatus according to a first embodiment of the present invention.

FIG. 3 indicates a configuration of the first embodiment of the phase difference measuring apparatus according to the present invention.

As shown in FIG. 3, The phase difference measuring apparatus comprises: a differential amplifier (addition/subtraction device) 2 which amplifies the difference between a first input signal 101-$a$ and a second input signal 101-$b$, input from the respective signal sources through adding (summing) resistors (input resistors) 1$a$ and 1$b$; a switch (multiplexer) 11 which sequentially switches and selects these two input signals and the output of the differential amplifier 2; an A/D converter 4 which converts the analog outputs of the switch into digital data; sampling signal generator 5 which input sampling signals to the A/D converter 4; and a DSP (Digital Signal Processor) or microcomputer 6. As is apparent from FIGS. 1 and 3, the phase difference measuring apparatus of the first embodiment differs from the apparatus shown in FIG. 1 in that the switch 11 and the common A/D converter 4 are used instead of the three A/D converters.

As mentioned above, the terms A, B, C, and a in equation (2) must be measured precisely. However, the scale error of, for example, 0.5% and an aperture time delay (or a phase delay) of, for example, 40 nsec, are generated in the apparatus of FIG. 1 comprising three A/D converters, which include differences in characteristics. Broadly speaking, the effect of scale error on the measurement precision is bigger than that of the aperture time delay. Thus, the measurement precision of the apparatus of FIG. 1 is 0.5% or less. The measurement error of the first embodiment is much smaller than that of the apparatus of FIG. 1, because the first embodiment comprises the single common A/D converter 4. Though the first embodiment further comprises the switch (multiplexer) 11, the apparatus attains a smaller measurement error, in which a scale error of 0.01% and the phase error of 0.01 can be realized by selecting proper elements and configurations for the switch 11.

Figure 4:
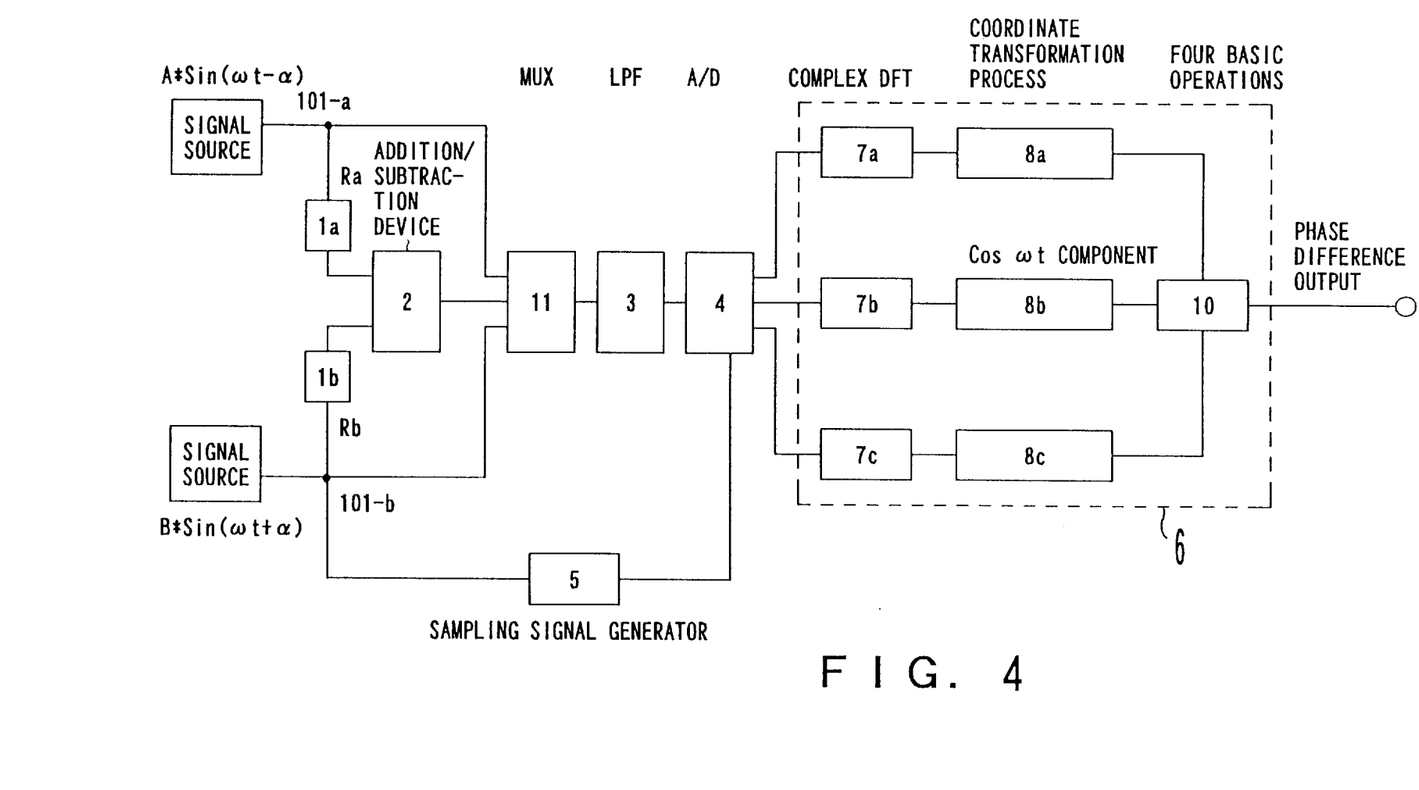
FIG. 4 shows a configuration of a phase difference measuring apparatus according to a second embodiment of the present invention.

FIG. 4 shows a configuration of the second embodiment of the a phase difference measuring apparatus according to the present invention.

As shown in FIG. 4, the second embodiment comprises an anti-aliasing filter 3 located between the switch 11 and the A/D converter 4 of the first embodiment, which performs as a common low pass filter (LPF). Therefore, the second embodiment differs from the apparatus of FIG. 1 in that the second embodiment commonly comprises the A/D converter 4, the anti-aliasing filter 3 and the switch 11. The anti-aliasing filter 3 prevents aliasing caused in the quantization process of the A/D converter 4.

If a plurality of filters are used in the apparatus as shown in FIG. 1, there are differences between the plurality of filters in the characteristics of passing band and phase delay. Such differences are eliminated in the second embodiment by the common filter 3.

Figure 5:
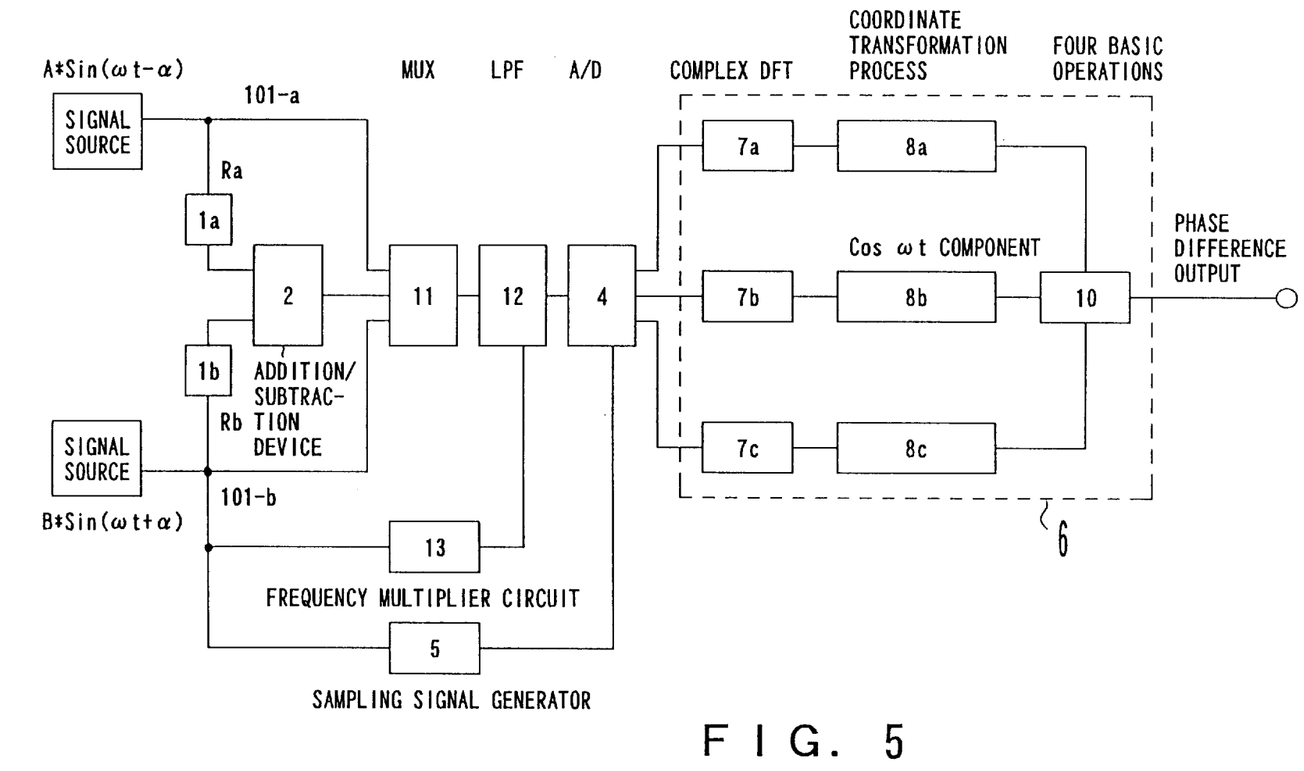
FIG. 5 shows a configuration of a phase difference measuring apparatus according to a third embodiment of the invention.

FIG. 5 shows a configuration of the third embodiment of a phase difference measuring apparatus according to the present invention.

In the phase difference measuring apparatus of the third embodiment, the filter 3 of the second embodiment is replaced with a low pass filter 12 of a frequency tracking type. The phase difference measuring apparatus of the third embodiment further comprises a frequency multiplier circuit 13, which generates a clock signal for controlling the low pass filter 12 based on the input signal, when a switched capacitance type filter is used for the low pass filter 12. Since the apparatus of FIG. 1 uses low pass filters of frequency fixed type, there arises a problem that the apparatus cannot handle a change in frequency of the measured signal.

If the frequency of the measured signal changes, the values of the gain and phase delay are also changed and the terms E, F, G, β, δ, ζ, etc. in equation (5) become functions of frequency f, which is indicated by the following equation (6).
First input signal:

$$E[f]*A*\sin(\omega t-\alpha-\beta[f])$$

Second input signal:

$$F[f]*B*\sin(\omega t+\alpha-\delta[f])$$

Output of the differential amplifier:

$$G[f]*(A-B)*C*\cos\alpha*\sin(\omega t - \zeta[f]) - \quad (6)$$

$$G[f]*(A+B)*C*\sin\alpha*\cos(\omega t - \zeta[f])$$

When the values of the terms E, F, G, β, δ and ζ vary according to the frequency, the equation for calculating the phase difference in the DSP or microcomputer 6 should be changed to the following equation (7) instead of the equation (4).

$$\alpha = \sin^{-1}[\{(D*G[f]*\sin(\gamma))/C* \quad (7)$$
$$\sin(\gamma - (\beta[f] + \delta[f] - \pi)/2)\}/(A*E[f] + B*F[f])]$$

Therefore, the values of the terms E, F, G, β, δ and ζ should be constant for the appropriate measurement. For this reason, the third embodiment uses the frequency tracking type filter, in which the cut-off frequency changes according to the frequency of the input signal, as the switched capacitance type filter 12. As a result, the changes in gain and phase can be decreased even if the frequency of the input signal varies.

Figure 6:
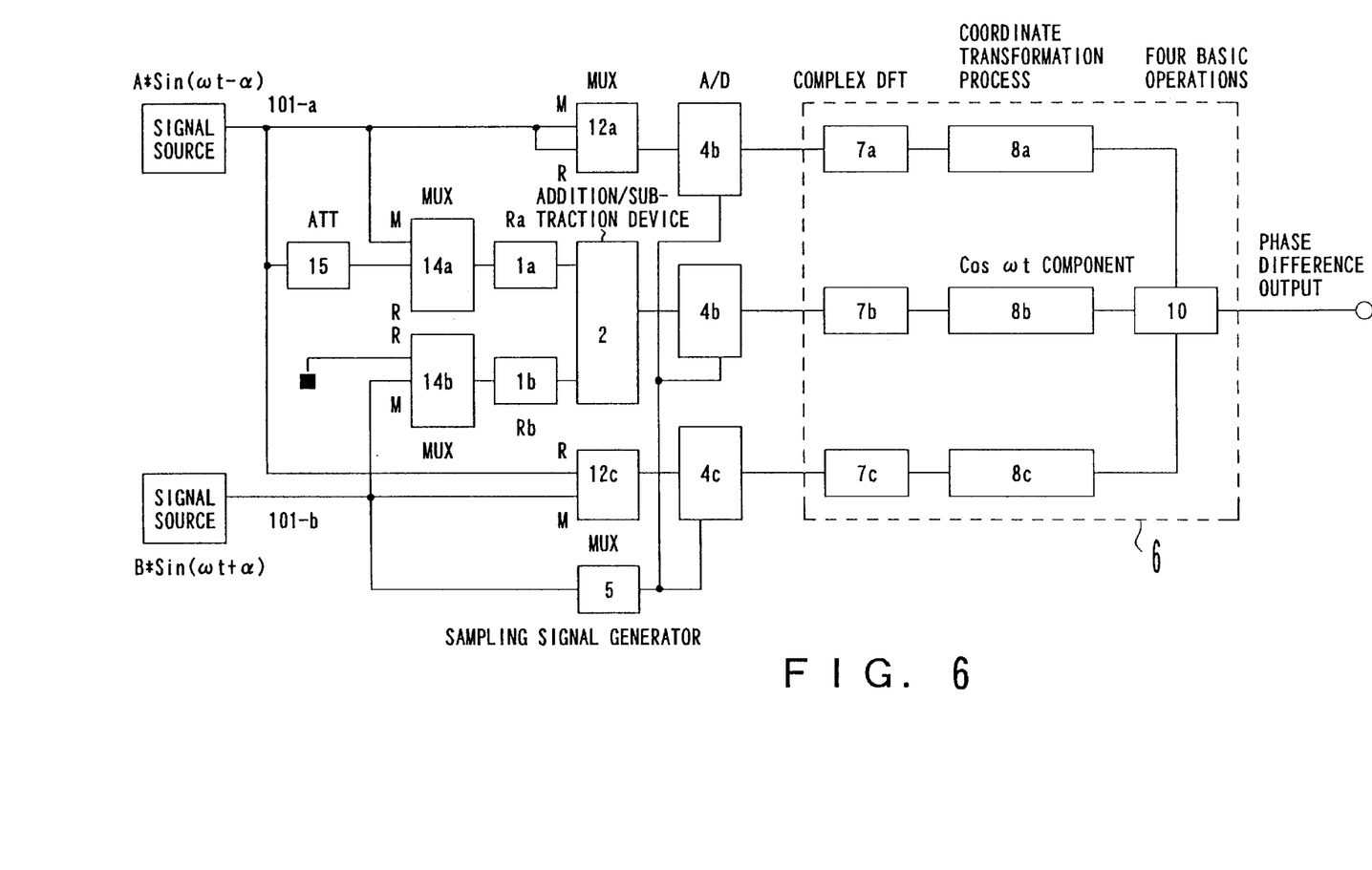
FIG. 6 shows a configuration of a phase difference measuring apparatus according to a fourth embodiment of the present invention.

FIG. 6 shows a configuration of a fourth embodiment of the phase difference measuring apparatus according to the present invention.

When the three signals, which are the first and second input signals and the output of the differential amplifier 2, should be read in one measurement period (one waveform cycle), the first through the third embodiments cannot be used for measuring the signals which vary every wavelength because the three signals must be measured at the same time. The fourth embodiment indicated in FIG. 6 can handle this case, because this apparatus comprises three A/D converters 4a, 4b and 4c which respectively correspond to the three signals, detects the differences in gain and phase delay between these converters based on a reference signal, and compensates or corrects the differences in the calculation of the phase difference.

The phase difference measuring apparatus according to the fourth embodiment comprises switches (reference signal selection unit) 12a, 12c, 14a and 14b in the input stages to the A/D converters 4a and 4c and the adding resistors 1a and 1b, as shown in FIG. 6, and further comprises an attenuator 15 before the switch 14a. Each of the switches 12a, 12c, 14a and 14b comprises two input terminals M and R. When the switches 12a, 12c, 14a and 14b select the input signal of the terminal M, A/D converters 4a, 4b, and 4c receive the first input signal 101-a, the output of the differential amplifier 2, and the second input signal 101-b, respectively, and the DSP or microcomputer 6 calculates the vectors (amplitudes and phases) of the digital signals output from the A/D converters 4a, 4b, and 4c.

In the next stage, the switches 12a, 12c, 14a and 14b select the R terminal and output the first input signal 101-a to the following stages. The input signal to the differential amplifier 2 is attenuated by the attenuator 15, which includes a precise resistance determining the amplitude factor. This allows a signal having the same level as that of the other lines to be input to the A/D converter 4b. Thus, differences in gains and phases between each line are detected after the vectors (amplitudes and phases) of the outputs from the A/D converters 4a, 4b, and 4c for the reference signal are measured. Then, the compensation of the detected differences with respect to the calculated phase differences is performed in the DSP 6, which provides a high precision measurement of the phase difference. The process described above is described in equations as follows.

(1) The vector after A/D conversion when the switches select the input of their M terminals:
First input signal:

$$E[f]*A*\sin(\omega t-\alpha-\beta[f])$$

Second input signal:

$$F[f]*B*\sin(\omega t+\alpha-\delta[f])$$

Output of the differential amplifier:

$$G[f]*(A-B)*C*\cos\alpha*\sin(\omega t - \zeta[f]) - \quad (6)$$

$$G[f]*(A+B)*C*\sin\alpha*\cos(\omega t - \zeta[f])$$

Here, E and β respectively indicate a gain and a phase delay regarding the A/D converter 4a in the line of the first input signal, F and γ respectively indicate a gain and a phase delay regarding the A/D converter 4c in the line of the second input signal, and G and ζ respectively indicate a gain and a phase delay regarding the A/D converter 4b in the line of the output from the differential amplifier 2.

(2) The vector after A/D conversion when the switches select the input of their R terminals:
First input signal line:

$$E[f]*A*\sin(\omega t-\alpha-\beta[f])$$

Second input signal line:

$$F[f]*A*\sin(\omega t-\alpha-\delta[f])$$

Output line for the differential amplifier:

$$G[f]*(A*C/C*\sin(\omega-\alpha-\zeta[f]) \quad (8)$$

Using the factors indicated in (8), the gains and phases in the three lines are obtained as follows:
First input signal line:

gain=1, phase delay =0

Second input signal line:

gain =$F[f]/E[f]$, phase delay=$\beta[f]-\delta[f]$

Output line for the differential amplifier:

gain=$G[f]/E[f]$, phase delay=$\beta[f]-\zeta[f]$

This indicates that differences exist between these lines.
(3) The compensation of the differences between the lines:
First input signal line:

$$D[f]/1*A*\sin(\omega t-\alpha-\beta[f])$$

Second input signal line:

$$E[f]/(E[f]/D[f])*B*\sin(\omega t+\alpha-\delta[f]-(\beta[f]-\delta[f]))$$

Output line for the differential amplifier:

$$G[f]/(G[f]/D[f])*(A - B)*C*\cos\alpha*\sin\{\omega t - \xi[f] - (\beta[f] - \xi[f])\} -$$

$$G[f]/(G[f]/D[f])*(A + B)*C*\sin\alpha*\cos\{\omega t - \xi[f] - (\beta[f] - \xi[f])\}$$

These are simplified as follows:
First input signal line:

$$D[f]*A*\sin(\omega t - \alpha - \beta[f])$$

Second input signal line:

$$D[f]*B*\sin(\omega t + \alpha - \beta[f])$$

Output line for the differential amplifier:

$$D[f]*(A - B)*C*\cos\alpha*\sin(\omega t - \beta[f]) - \qquad (9)$$

$$D[f]*(A + B)*C*\sin\alpha*\cos(\omega t - \beta[f])$$

As shown in items of (9), the values of the compensation are indicated by fundamental equations similar to those of (1) and (2), which include a certain gain and phase. Therefore, if a difference in characteristics exists between the three lines, the effect on the measurement accuracy can be eliminated by the compensation. The first through third embodiments cannot be used for the measurement in which the input signals change every few wavelengths and the signals in the three lines must be measured during the same measurement period. However, such measurement can be performed by the fourth embodiment and a high measurement accuracy can be realized, if the compensation items (frequency, temperature, etc.) and measurement conditions do not change very widely. This kind of compensation may be performed after each calculation of the phase difference between two input signals.

Figure 7:
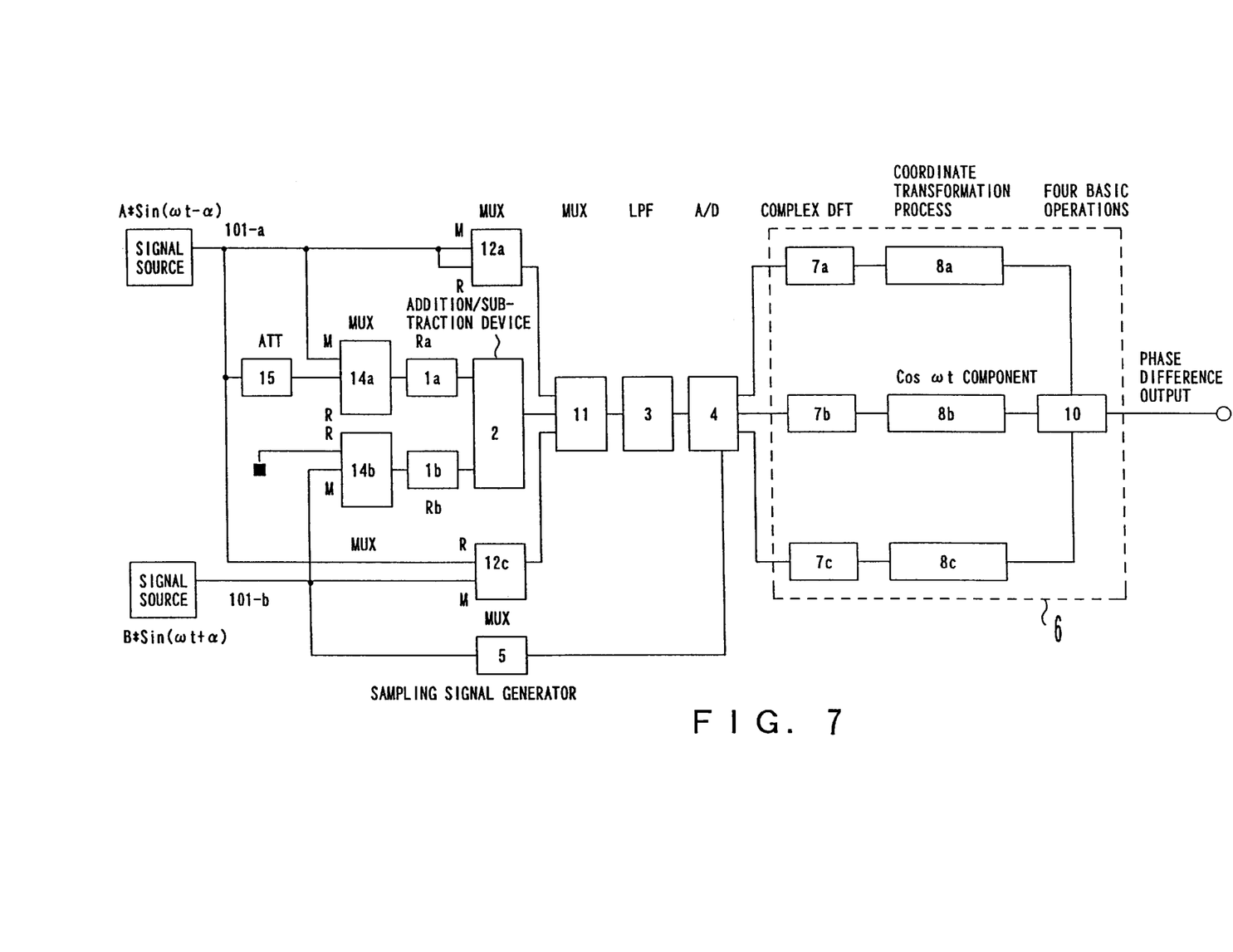
FIG. 7 shows a configuration of a phase difference measuring apparatus according to a fifth embodiment of the present invention.

FIG. 7 shows a configuration of the fifth embodiment of the phase difference measuring apparatus according to the present invention.

The fifth embodiment is used for a measurement in which the three signals do not need to be read in one period, that is, the signals are maintained stable over a long time. The fifth embodiment is obtained by adding the switches 12a, 12c, 14a and 14b and the attenuator 15 of the fourth embodiment to the apparatus of the second embodiment, whereby the above described compensation function is attached to the second embodiment.

Therefore, the fifth embodiment can perform the compensation when the characteristics of the common low pass filter 3 and the common A/D converter 4 vary according to a temperature change during the measurement process by using the switching function of the switch 11. Since the process of the compensation is the same as that indicated above for the fourth embodiment, the explanation is omitted.

Figure 8:
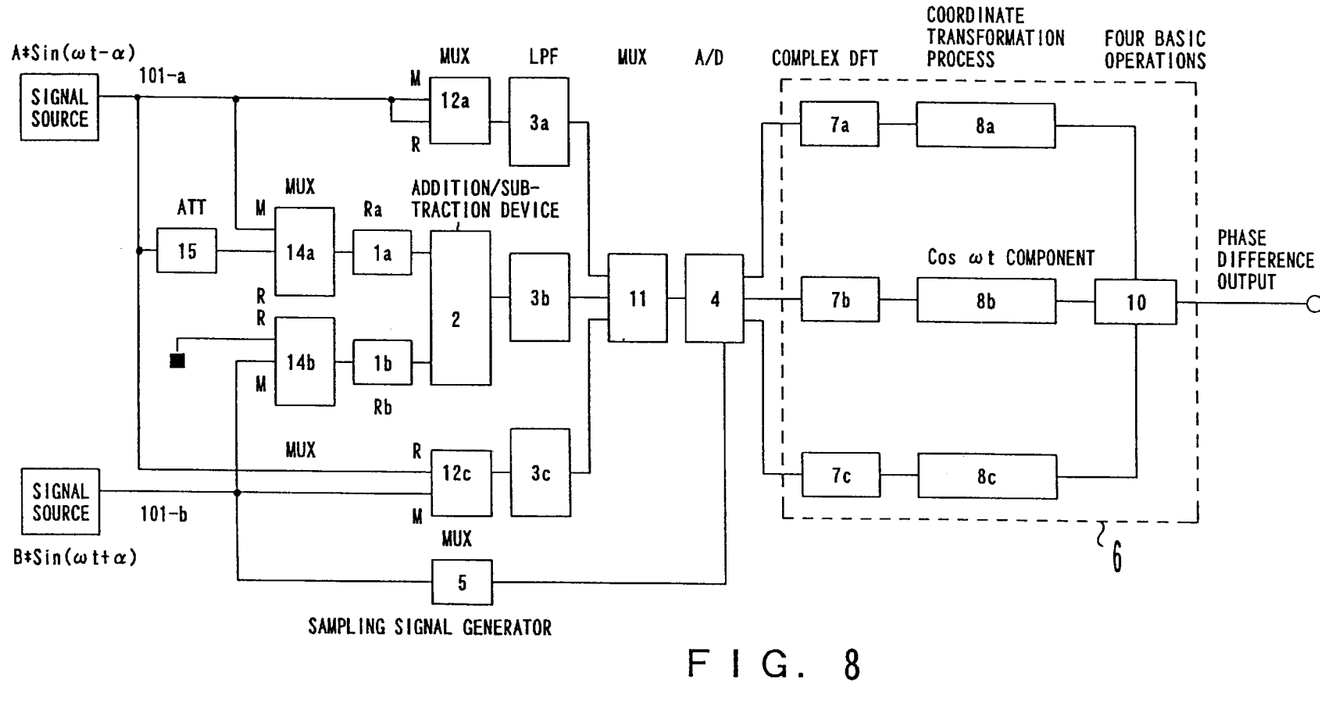
FIG. 8 shows a configuration of a phase difference measuring apparatus according to a sixth embodiment of the present invention.

FIG. 8 shows a configuration of the sixth embodiment of the phase difference measuring apparatus according the present invention.

Figure 9:
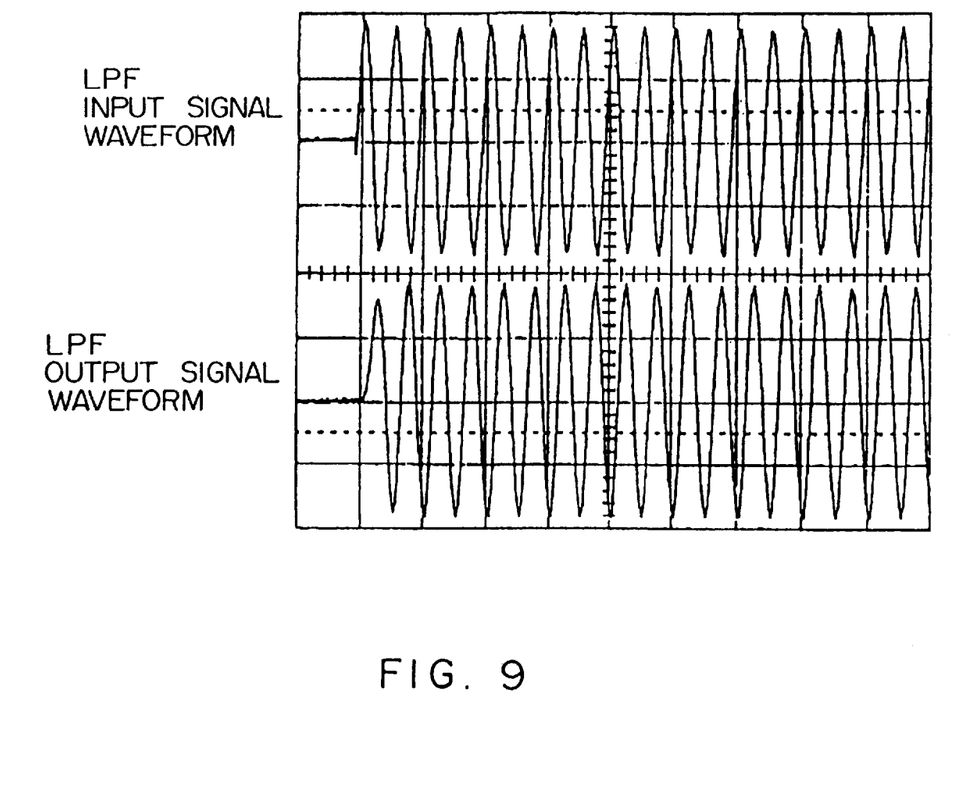
FIG. 9 is a waveform graph illustrating a transient response characteristic of the LPFs in FIG. 8.

The phase difference measuring apparatus comprises three low pass filters 3a, 3b and 3c before the switch 11, instead of the common low pass filter 3 used in the fifth embodiment. In the fifth embodiment, the common low pass filter 3 is used with switching of the three signals. As a result, the switched signal will not be stable in the first measurement period (first waveform cycle), as shown in FIG. 9, accordingly at least one period, and normally five periods which includes a safety margin, is necessary before the measurement to realize a stable measurement. This time lag should be avoided for the quick measurement.

The configuration of the fourth embodiment is desirable for the measurement of the three signals which change every few wavelengths, because the three signals should be read in one measurement period and calculated at the same time. However, this embodiment includes the following disadvantages.

(1) The cost becomes high because of the need for three A/D converters.
(2) Aliasing occurs because of the absence of an anti-aliasing filter.

These disadvantages can be outweighed by the sixth embodiment.

In this embodiment, the low pass filters 3a, 3b and 3c are provided for the three signals (signal lines), respectively, and the outputs of the low pass filters 3a, 3b and 3c are switched by the switch 11 and output to the common A/D converter 4. Therefore, the transient phenomena caused by switching in a low pass filter can be eliminated. In this case, the compensation of the output signal is performed for each of the low pass filters 3a, 3b and 3c, the switch 11 and the A/D converter 4.

Figure 10:
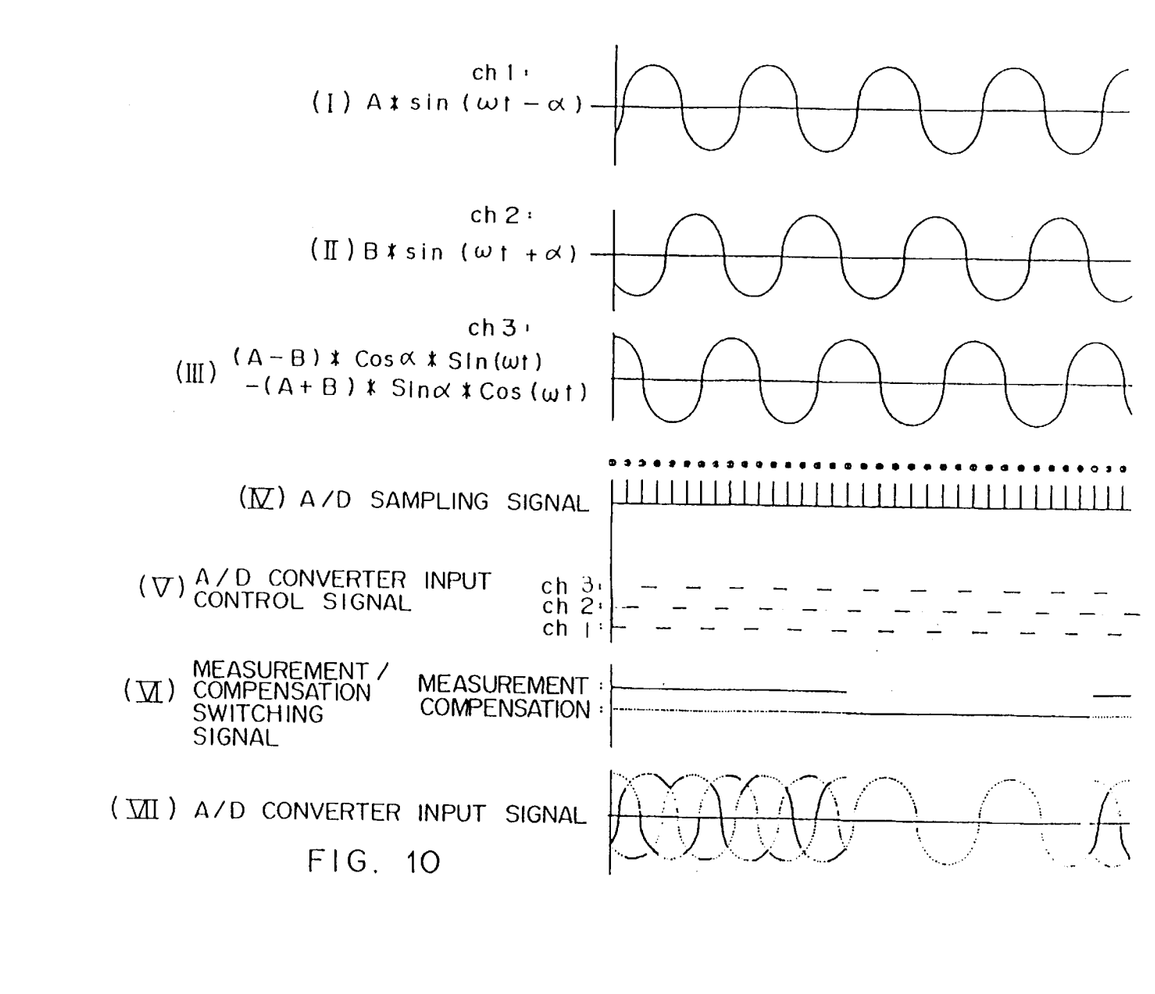
FIG. 10 indicates waveforms of signals in the apparatus shown in FIG. 8.

FIG. 10 indicates the waveforms of signals in the apparatus according to the sixth embodiment. (I), (II) and (III), in FIG. 10 indicate the first input signal, second input signal and the output of the differential amplifier 2, respectively, and (IV), (V), (VI), and (VII) indicate the sampling signal, a control signal for the A/D converter 4, a control signal for the switches 12a, 12c, 14a and 14b (measurement—compensation selecting signal), and the input of the A/D converter 4, respectively.

Referring to FIG. 10, the operation of this embodiment will be described below.

In the measurement mode, the switches 12a, 12c, 14a and 14b select the signals input to their M terminal for the measurement. Eight sampling signals are generated by the sampling signal generator 5 in one wavelength of the three signals, as shown by (I) through (IV) of FIG. 10, and the switch 11 controls the input signal to the A/D converter 4 for each of the sampling signals, as shown in (V) of this figure, so as to perform the quantization of the three signals, which is indicated in (VII) of this figure.

When the sampling number of data reaches a predetermined number, the DSP or microcomputer 6 preforms the complex DFT process with DFT units 7a, 7b and 7c and the coordinate transformation process with coordinate transformation process units 8a, 8b and 8c so as to obtain the vectors for the measured signals. After that, the mode is changed to a compensation mode, and the control signal for the switches 12a, 12c, 14a and 14b is changed so that the reference signal is selected from their R terminal. In this mode, vectors are obtained for the reference signal and the compensation for the measured signal is performed using the obtained vectors for the reference signal.

Figure 11A:
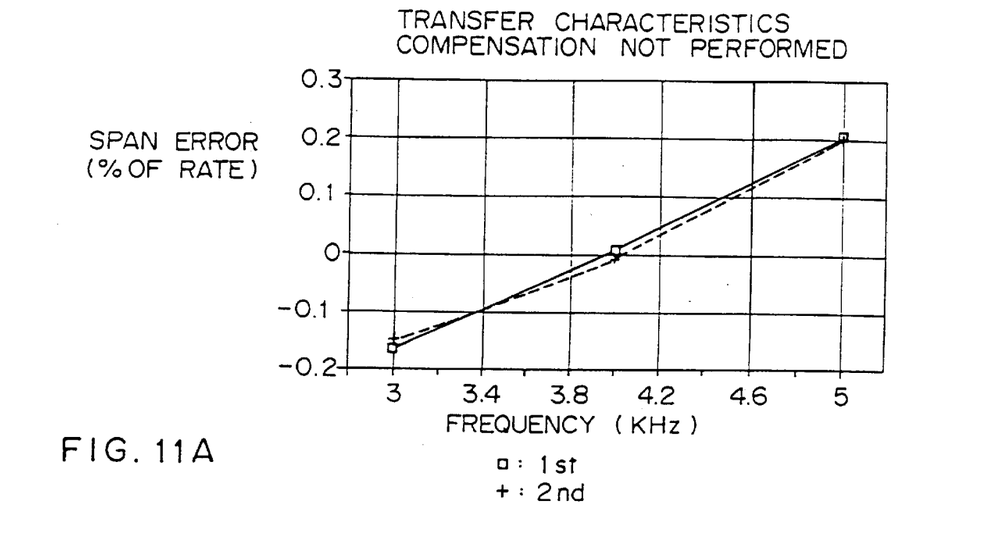
FIGS. 11A and 11B are frequency characteristics diagrams illustrating an effect of the present invention.
Figure 11B:
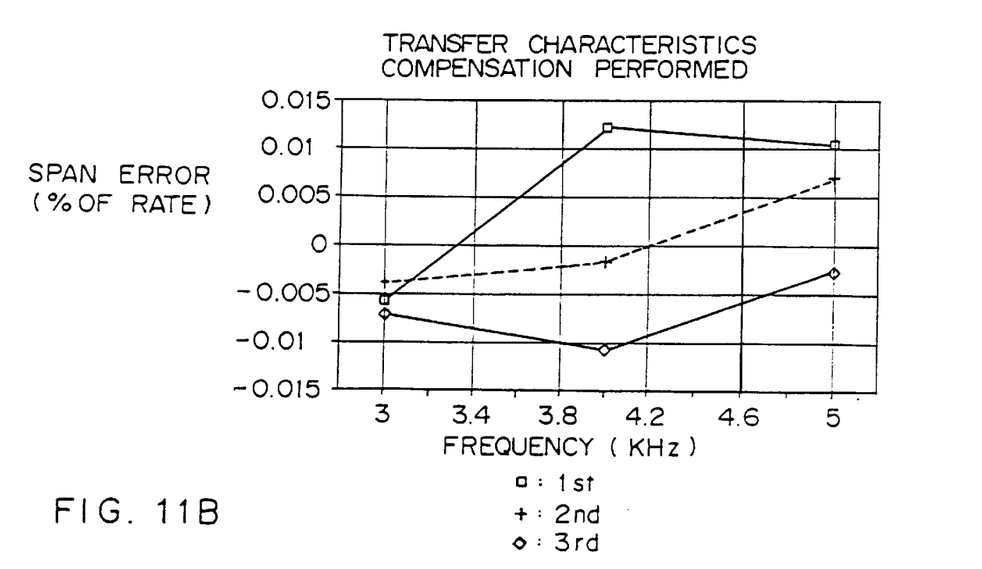

FIGS. 11A and 11B indicate the frequency characteristics of span errors in the phase difference measurements of the apparatus of FIG. 1 and the sixth embodiment according to the present invention. These figures indicate that the measurement accuracy of the sixth embodiment is about ten times that of the apparatus of FIG. 1.

According to the present invention, the phase difference measuring apparatus comprises the common A/D converter together with the switch for sequentially switching the three signals, or the common A/D converter and the common low pass filter together with the switch. Therefore, the effects of the difference in frequency and temperature characteristics between A/D converters and low pass filters can be reduced or avoided. The effect of the frequency characteristics can be further reduced by using the tracking type filter, if this filter is used as a low pass filter to maintain the transfer characteristics (gain, phase) over the measuring frequency at a certain value.

Furthermore, the effects of the frequency and temperature characteristic differences can be eliminated by the compensation process according to the present invention, because the transfer characteristics of the three lines, including the two input lines and the line related to the differential amplifier, are measured using the reference signal, which is one of the two input signals and includes the same frequency and amplitude, and compensated in the calculation of the phase difference or time difference. Therefore, high precision measurement of the phase difference can be performed if the transfer characteristics differ between elements of the phase difference measuring apparatus.

What is claimed is:

1. A phase difference measuring apparatus for measuring a phase difference between two input signals having a same frequency, comprising:

addition/subtraction means for obtaining and outputting one of a sum and a difference of said two input signals;

switching means for sequentially selecting and outputting said two input signals and an output of said addition/subtraction means;

A/D converter means for converting output signals of said switching means into discrete data; and calculation means for calculating the phase difference between said two input signals based on outputs of said A/D converter means.

2. The phase difference measuring apparatus according to claim 1, further comprising:

filter means for selectively passing low frequency components of output signals of said switching means to said A/D converter means.

3. The phase difference measuring apparatus according to claim 2, wherein said filter means is a frequency tracking type filter.

4. The phase difference measuring apparatus according to claim 1, further comprising:

reference signal selection means for selecting one of said two input signals as a reference signal and outputting said reference signal to said addition/subtraction means and said switching means, wherein said calculation means calculates transmission characteristics of at least one of said addition/subtraction means and said A/D converter means based on output signals of said A/D converter means corresponding to said reference signal, and corrects said calculated phase difference of said two input signals using said calculated transmission characteristics.

5. The phase difference measuring apparatus according to claim 4, further comprising:

filter means for selectively passing low frequency components of output signals of said switching means to said A/D converter means, wherein said calculation means calculates transmission characteristics of said filter means for correcting said calculated phase difference.

6. The phase difference measuring apparatus according to claim 4, further comprising:

three filter means for selectively passing low frequency components included in an output of said addition/subtraction means and said two input signals, which are input to said switching means, respectively.

7. A phase difference measuring apparatus for measuring a phase difference between two input signals having a same frequency, comprising:

addition/subtraction means for obtaining and outputting one of a sum and a difference of said two input signals;

A/D converter means for converting said two input signals and an output signal of said addition/subtraction means into discrete data;

reference signal selection means for selecting one of said two input signals as a reference signal and outputting said reference signal to said addition/subtraction means and said A/D converter means; and calculation means for calculating the phase difference between said two input signals based on outputs of said A/D converter means, calculating transmission characteristics of at least one of said addition/subtraction means and said A/D converter means based on output signals of said A/D converter means corresponding to said reference signal if said reference signal selection means selects said reference signal, and correcting said calculated phase difference using said calculated transmission characteristics.

8. The phase difference measuring apparatus according to claim 7, further comprising:

switching means for sequentially selecting said two input signals and an output of said addition/subtraction means and outputting the selected signal to said A/D converter means.

9. The phase difference measuring apparatus according to claim 8, further comprising:

filter means for selectively passing low frequency components of output signals of said switching means to said A/D converter means.

10. The phase difference measuring apparatus according to claim 8, further comprising:

three filter means for selectively passing low frequency components included in an output of said addition/subtraction means and said two input signals, which are input to said switching means, respectively.

11. A phase difference measuring method for measuring a phase difference between two input signals having a same frequency, comprising the steps of:

obtaining one of a sum and a difference of said two input signals and outputting a first signal;

sequentially selecting said first signal and said two input signals and outputting a second signal;

converting said second signal into discrete data; and calculating the phase difference between said two input signals based on said discrete data.

12. A phase difference measuring method for measuring a phase difference between two input signals having a same frequency, comprising the steps of:

obtaining one of a sum and a difference of said two input signals and outputting a first signal;

converting said first signal and said two input signals into discrete data;

calculating the phase difference between said two input signals based on said discrete data;

selecting one of said two input signals as a reference signal;

calculating transmission characteristics of a device through which said reference signal passes based on said reference signal; and correcting said calculated phase difference using said calculated transmission characteristics.

* * * * *